June 2, 1970  R. H. JOHNSON  3,515,011
LUBRICATION AND COOLING OF HIGH SPEED GEARS
Filed Aug. 29, 1968
Fig. 1.
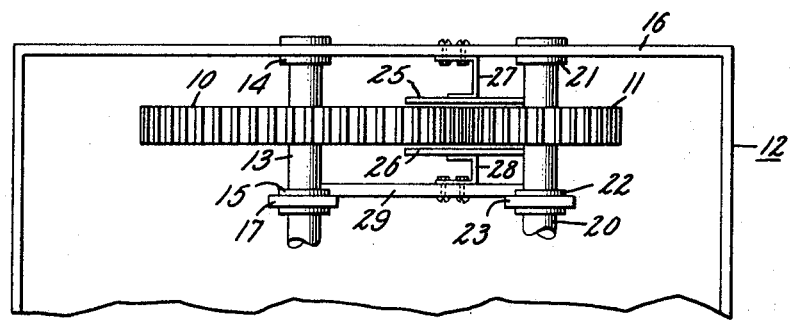
Fig. 2.
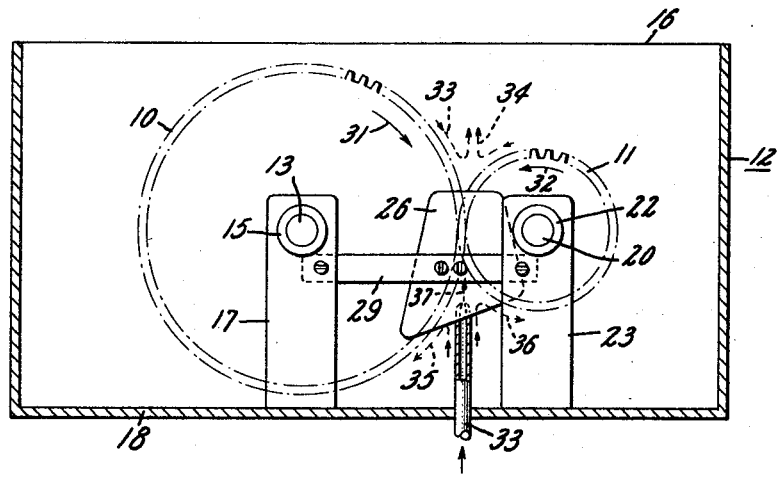
Fig. 3.
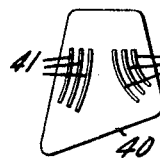
Fig. 4.
Inventor:
Robert H. Johnson,
by Julius J. Zaskalicky
His Attorney.

United States Patent Office 3,515,011
Patented June 2, 1970

3,515,011
LUBRICATION AND COOLING OF HIGH SPEED
GEARS
Robert H. Johnson, Schenectady, N.Y., assignor to
General Electric Company, a corporation of New
York
Filed Aug. 29, 1968, Ser. No. 756,192
Int. Cl. F16n 29/100; F16h 57/04
U.S. Cl. 74—467                                    6 Claims

ABSTRACT OF THE DISCLOSURE

A pair of gears operating at high peripheral speed in a gaseous environment are provided with a pair of side plates on the side of the gears where the peripheral portions diverge from one another to inhibit axially directed flow of gas and create a low pressure region between the plates. Lubricating and cooling liquid is injected into this low pressure region to effect lubrication and cooling of the gears.

---

The present invention relates to the lubrication and cooling of gears and, in particular, relates to means for lubricating and cooling gears which are operated at high peripheral speeds in gaseous environments.

A primary object of the present invention is to provide an effective means for lubricating and cooling gears operating at high peripheral speeds in gaseous environments.

In carrying out the invention in one exemplary form as applied to a pair of meshing spur gears there is provided a pair of side plates, each extending between peripheral portions of adjacent sides of the gears. Each of the plates extends from the region of contact of the gears outward in the direction of divergence of the peripheral portions of the gears. The plates function to preserve the low pressure region created within the volume bounded by the plates by the pumping action of the teeth of the gears. Means are provided for injecting lubricant and coolant into the low pressure region.

The features of my invention which I desire to protect herein are pointed out with particularity in the appended claims. The invention itself, however, both as to its organization and method of operation together with further objects and advantages thereof may best be understood by reference to the following description taken in connection with the accompanying drawings wherein:

FIG. 1 is a plan view of a portion of a gear assembly in accordance with one embodiment of my invention.

FIG. 2 shows a side view of the gear assembly of FIG. 1.

FIG. 3 is a plan view of an alternative construction of plate suitable for use in side plates in the embodiment of FIGS. 1 and 2.

FIG. 4 is a side view of the plate of FIG. 3.

In FIGS. 1 and 2, there is shown a pair of gears 10 and 11 in meshing relationship mounted in a housing or casing 12. Only a portion of the casing 12 is shown as the meshing gears may be part of a larger assembly of gears. The gear 10 is fixedly mounted on a shaft 13 which in turn is supported in a pair of bearings 14 and 15. Bearing 14 is mounted in a side wall 16 of the casing and the bearing 15 is mounted on a support structure 17 secured to the base 18 of the casing. Similarly, the gear 11 is mounted on a shaft 20 which is supported by a pair of bearings 21 and 22. Bearing 21 is mounted in the side wall 16 of the casing and bearing 22 is mounted on a support 23 secured on the base 18 of the casing. The shafts 13 and 20, each shown with a break at one end, may be connected to other gears or other devices. Either shaft, of course, may serve as a drive or driven shaft.

A pair of side plates 25 and 26 are provided on each of the sides of the gear assembly. Side plate 25 is supported by a bracket 27 fixedly fastened between the side plate 27 and the side wall 16. Side plate 26 is supported by a bracket 28 secured to a cross piece 29 connected between the upright support structures 17 and 23. Each of the plates 25 and 26 are mounted close to the sides of the gears 10 and 11. Each of the side plates 25 and 26 extends between peripheral portions of adjacent sides of the gears 10 and 11. Each of the plates extends from the region of contact or engagement of the teeth of the gears outward in the direction of divergence of the teeth of the gears. A nozzle 30 is provided on the divergent side of the pair of gears for supplying or injecting lubricant for cooling and lubrication purposes into the volume encompassed by the surfaces of the gears and the side plates on the divergent side of the gear assembly. The nozzle may be secured to the base 18 of the casing and extend into the volume bounded by the plates 25 and 26.

In the operation of the subassembly or gear train shown in FIGS. 1 and 2 in a gaseous atmosphere, the gears 10 and 11 are rotated in directions indicated by arrows 31 and 32, respectively at high peripheral speed. By high peripheral speed is meant a speed at which the pumping action produced by the teeth of the gears on the surrounding gas becomes significant. However, it should be noted that even at relatively low peripheral speeds, for example, 100 feet per second, the pumping action will be pronounced and the principles of the invention would apply. Gas flows are produced by the teeth of the gears 10 and 11 in the atmosphere surrounding the gears. The gas flows on one side, where the teeth of the gears 10 and 11 converge, referred to as the convergent side, are indicated by the arrows 33 and 34. The gas flows produced by the teeth in the gears 10 and 11 on the opposite side where the teeth are moving away from one another, referred to as the divergent side of the gear train, are indicated by arrows 35 and 36. The gas flow on the convergent side produces a high pressure region adjacent the area of engagement of the teeth of the gears and gas flows outward from that region. The gas flow on the divergent side of the gears produces a low pressure region adjacent the area of disengagement of the teeth of the gears. Such a low pressure region is particularly developed when flow of gases is confined to two dimensions, that is, when the flow in a direction parallel to the axis of the shafts 13 and 12 is limited. Plates 25 and 26 provide such restriction of flow in a direction parallel to the axis of rotation of the gears. Such plates should be sufficiently closely spaced to the sides of the gear that leakage in is much less than flow of gases inward from the open end of the volume enclosed by the plates. Such plates essentially limit the flow to planes which are normal to the axes of rotation of the gears.

Labyrinth type seals may be used on the plates 25 and 26 to reduce leakage of gas between the plates and the sides of gears. One form of labyrinth seal is shown in FIGS. 3 and 4. On one side of plate 40, which may correspond to either plate 25 or plate 26 of FIGS. 1 and 2, are located a plurality of thin arcuate ridges 41 and 42. When assembled on a gear train the ridges 41 would abut the side of one gear, for example gear 10, and the ridges 42 would abut the adjacent side of the other gear, for example gear 11, and thus provide a tight seal to the gas flow path between the sides of the gears and the plate.

As the gears disengage, hot spots are produced thereon. The lubricating and cooling fluid injected or sprayed by the nozzle 33 in the direction indicated by arrow 37 adjacent to the point of contact of the gears 10 and 11 is drawn into the low pressure region adjacent to the teeth of the gears which have just disengaged. The fluid cools the hot spots formed therein before such hot spots have a time to propagate heat inward into the gears, thus effectively cooling the gears. In addition, lubricant is immediately reapplied to areas of the teeth that may have been wiped clean by the engagement of the gears, or sucked up, on separation of the teeth of the gears. Such lubricant is retained on the teeth of the gears during the revolution thereof, and accordingly when such teeth are again brought into engagement lubricant is available for lubrication as well as cooling purposes in the conventional manner. The lubricant and coolant may be introduced into the low pressure region on the diverent side of the gears in any of a number of ways, for example, as a spray or as a liquid.

My invention can be used to advantage with meshing gears operating at peripheral speeds which may extend over a wide range. My invention is particularly effective in gear trains which are heavily loaded. My invention enables gear trains of a predetermined power transmission rating to be lighter, smaller, and cheaper than heretofore.

While I have shown a particular embodiment of my invention, it will, of course, be understood that I do not wish to be limited thereto since many modifications may be made in the structural arrangement shown and in the instrumentalities employed. Bevel gears could be sealed in the same manner with plates corresponding to plates 25 and 26 of FIGS. 1 and 2 set at the gear angle. Also, any other configuration could be used which will allow sealing of the volume following the contact point of the gears.

What I claim as new and desire to secure by Letters Patent of the United States is:

1. In combination,
   a pair of gears in meshing relationship having a diverging side with respect to the motion of the teeth thereof,
   said gears being surrounded by a gaseous atmosphere,
   means for restricting flow of said surrounding gases on said divergent side of said gears adjacent to the region of contact thereof in directions parallel to the axes of rotation of said gears, and
   means for injecting a fluid on said divergent side of said gears in the vicinity of disengagement of said gears.

2. The combination of claim 1 in which said gears are adapted to rotate at high peripheral speeds.

3. The combination of claim 2 in which said gears are spur gears.

4. In combination,
   a pair of gears in meshing relationship and having a converging and a diverging side in respect to the motion of the teeth thereof,
   said gears adapted to rotate at high peripheral speeds and under heavy load,
   said gears being surrounded by a gaseous atmosphere,
   means for confining flow of said surrounding gases on said divergent side of said gears in the vicinity of engagement thereof to planes normal to the axes of rotation of said gears, and
   means for injecting a cooling and lubricating fluid on said divergent side of said gears in the vicinity of disengagement of said gears.

5. The combination of claim 4, in which said confining means includes a pair of plates each extending between adjacent sides of said gears, said plates substantially enclosing a portion of the volume bounded by the peripheral surfaces of said gears on the diverging side of said pair of gears whereby induced flow of said gases produces a region of low pressure in the vicinity of disengagement of said gears.

6. The combination of claim 4 in which labyrinth type seals are provided on said plates on portions thereof adjacent to the sides of said gears.

References Cited

UNITED STATES PATENTS 3,383,937   5/1968   Toenne et al. _____ 74—467

LEONARD H. GERIN, Primary Examiner